UNITED STATES PATENT OFFICE.

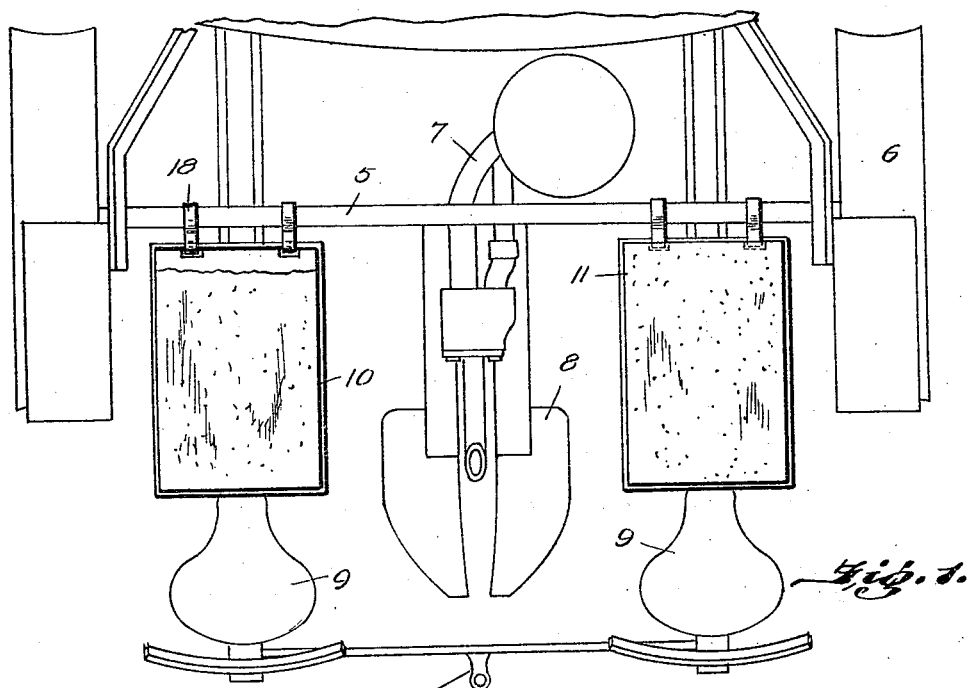
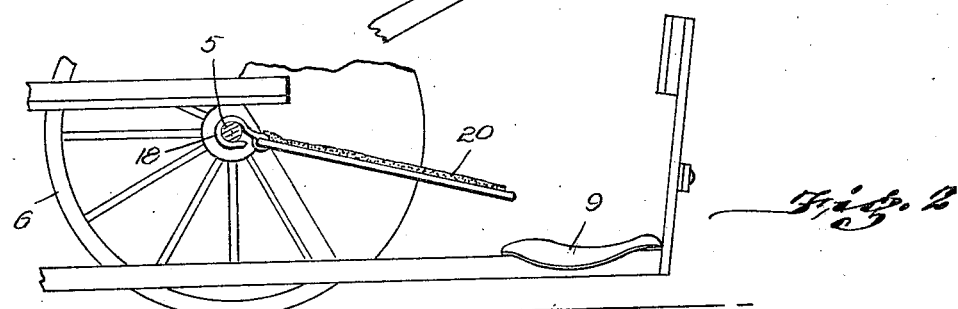
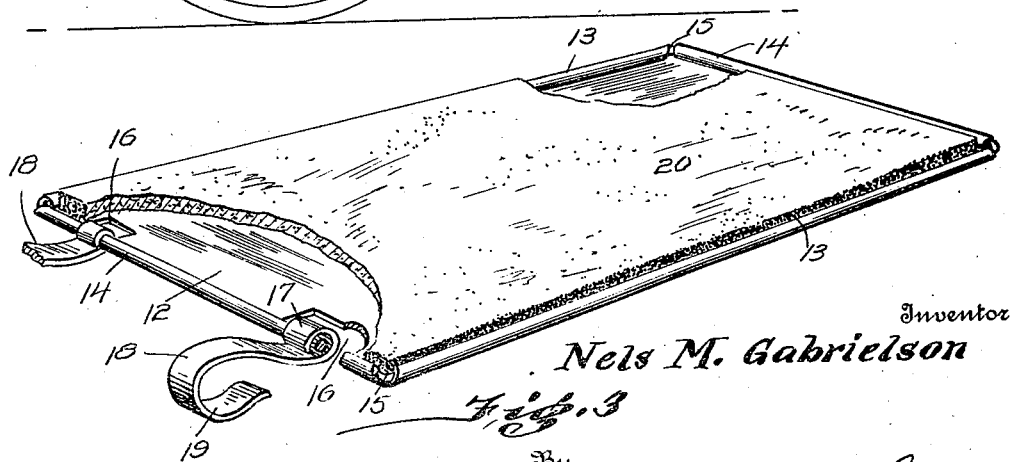

NELS M. GABRIELSON, OF WESTBY, WISCONSIN.

PLANTING-MACHINE ATTACHMENT.

1,413,398.　　　　Specification of Letters Patent.　　Patented Apr. 18, 1922.

Application filed July 22, 1921. Serial No. 486,690.

*To all whom it may concern:*

Be it known that I, NELS M. GABRIELSON, a citizen of the United States, residing at Westby, in the county of Vernon and State of Wisconsin, have invented certain new and useful Improvements in Planting-Machine Attachments, of which the following is a specification.

This invention relates to transplanting machines and more particularly to a novel and improved hingedly connected plant receiver tray or holder adapted for detachable connection to the main axle of the machines.

The primary object of the invention is the provision of a plant receiving tray or holder to be hingedly supported from the rear or main axle of a transplanting machine so that the said tray may rest on the lap of the planter and consequently in close proximity to the ground for convenient transplanting.

One of the objects of the invention resides in a hingedly connected detachable, transplanting tray or holder wherein the same may be conveniently attached to the main axle of various types of transplanting machines, one on each side of the fertilizer distributor and cover, to facilitate transplanting during the travel of the machine over the ground.

Another and very important object of the invention is the provision of a novel and improved transplanting tray which may be constructed of different material and capable of being used in connection with practically any type of transplanting machine, and one which is extremely simple in construction, rigid and durable, practical yet capable of being manufactured at a very low cost whereby its commercial possibilities are greatly enhanced.

The invention will be best understood from a consideration of the following detailed description taken in connection with the accompanying drawing forming a part of the specification with the understanding however that the invention is not confined to any strict conformity with the showing of the drawing but may be changed and modified so long as such changes and modification mark no material departure from the salient features of the invention as expressed by the subject matter being claimed.

In the accompanying drawings:—

Figure 1 is a plan showing the transplanting tray connected to the main axle of a transplanting machine, Fig. 2 is a side view of the same, and, Fig. 3 is a detached view of the tray.

Referring now to the drawings, wherein like parts designate corresponding parts throughout the several views, 5 designates the main supporting axle for the ground wheels 6 of the transplanter which carries the usual seed distributing mechanism 7 and cover 8 disposed between the seats 9 of the machine, all of which are of a well known and standard construction.

The transplanting trays 10, 11 on each side of the fertilizer distributor and cover each comprises a rectangular frame 12 the sides 13 of which are curved inwardly similar to the inwardly curved edges 14 of the respective ends of the tray so as to provide openings 15 at the respective corners to facilitate the cleaning of the tray when so desired. The front portion of the tray is cut away as shown at 16 to provide apertures and permit the bent ends 17 of a pair of clips 18 to be passed therethrough and secured to the inwardly curved edge 14 of the tray. The free ends 19 of the respective clips are bent inwardly so as to be hingedly connected and freely swung on the axle 5 in such manner that the opposite end of the tray may rest on the lap of the planter who is seated in close proximity to the ground during the forward travel of the machine when transplanting. A felt pad 20 or other suitable material may be held by the rectangular transplanting tray to absorb moisture from the roots of the plant and prevent the same from trickling on the lap of the planter.

The simple arrangement of the transplanting tray and the method of securing the same on the axle of the machine so as to rest on the lap of the planter is such that the transplanting is facilitated by reason of the fact that the tray is conveniently positioned in close proximity to the ground and therefore does not require stooping and bending of the body to transplant the plants. The simple device thus overcomes the objection to the old and objectionable method of carrying the plants in burlap or other porous holders or containers where the moisture passes through and thus makes transplanting disagreeable. Furthermore the tray may be easily detached from the axle of the machine and carried to and from the hot house for instance, so that a plurality of such trays may be carried by the machine and detached and attached when the plants have been removed therefrom. Since the frames are of rectangular formation and substantially flat, they may be stacked in an easy and convenient manner when not in use requiring a minimum of space and thus constitute a very important and convenient transplanting machine attachment.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the United States is:—

As a new article of manufacture, an attachment for transplanters comprising a tray formed from sheet metal having upwardly and inwardly curved edges, and an absorbent pad covering the tray between the edges thereof, clips at the forward end of said tray adapted for attachment to any suitable part of a transplanter, said tray being designed at its rear end to be held upon the lap of the operator.

In testimony whereof, I affix my signature hereto.

NELS M. GABRIELSON.